UNITED STATES PATENT OFFICE.

MAXIMILIAN TOCH, OF NEW YORK, N. Y.

WATERPROOF COMPOUND.

No. 802,870.

Specification of Letters Patent.

Patented Oct. 24, 1905.

Application filed November 18, 1904. Serial No. 233,380.

*To all whom it may concern:*

Be it known that I, MAXIMILIAN TOCH, a citizen of the United States, and a resident of New York city, borough of Manhattan, county and State of New York, have invented certain new and useful Improvements in Waterproof Compounds and Processes of Manufacturing Them, of which the following is a specification.

My invention relates to waterproofing foundations, walls, roofs in buildings, cellars, vaults, cisterns, and buildings for whatever purpose by means of my new compound, a concentrated solution of a mixture of bituminous compounds and gums in organic solvents, which is employed when cold and on which layers of waterproof paper, felt, &c., are applied.

Whenever such bituminous compounds, asphalt-tar, pitch mixtures have been hitherto employed for the purpose of making foundations and walls impervious to water, it was necessary to employ them after heating to boiling in the molten state, and to avoid chilling of the waterproofing mixture it even became necessary to previously heat the bricks, mortar, cement on which the waterproofing mixtures were applied, the reason for the employment of the elevated temperature being that the mixtures when applied cold have no adhesive power and cracked badly. It thus is evident that this process of waterproofing offers particular difficulties in winter-time.

My new waterproofing compound, the concentrated solution of a mixture of bituminous compounds and gums in organic solvents, makes it possible to carry out the process of waterproofing at ordinary temperature and equally well in summer as in winter time.

The waterproofing layers produced with my new compound do not crack in winter-time nor run in hot weather, and owing to their elasticity the results are superior to those obtained according to the hot method.

Another great advantage offered by my new compound is that the waterproof paper or felt need not be applied immediately, as is the case in the old process of waterproofing.

As bituminous material I prefer to use asphaltum, as it occurs naturally or as it is produced in the distillation of petroleum. As a gum I prefer kauri, and as a solvent a mixture of chinawood-oil, linseed-oil, and either coal-tar benzol, petroleum naphtha, or turpentine.

To carry out my invention, I proceed as follows: One hundred pounds of hard bitumen are heated to 400° Fahrenheit. Then five pounds of linseed-oil are added, and as the temperature is reduced ten pounds of chinawood-oil are added. In a separate kettle fifty pounds of kauri gum are fused, and when fused five pounds of linseed-oil and fifty pounds of petroleum-bitumen are added. This is then reduced with sufficient turpentine, benzol, naphtha until at 70° Fahrenheit it is very thin and of a specific gravity of 0.95, and then it is mixed with the melted hard bitumen and after repeated stirring it is filtered and ready for use.

Although I have above described an example by which my new waterproofing compound may be obtained, I do not wish to be understood as limiting my claims to any process, nor do I wish to be understood as excluding from my claims equivalents for the ingredients, the apparatus, or the operations employed in the process. It is probable that substitutes may be employed without departing from the scope of the process intended to be secured hereby.

Having now described my invention and in what manner the same is to be performed, what I claim as new, and desire to secure by Letters Patent, is—

The new waterproofing compound which admits of cold application, composed of a mixture of hard bitumen dissolved in chinawood-oil and linseed-oil, to which a solution of gum-kauri, fused in linseed-oil, and petroleum-bitumen are added, and which liquid is then reduced to a specific gravity of about 0.95 by the addition of turpentine, benzol and naphtha, substantially as herein described.

In testimony whereof I have signed my name in the presence of two subscribing witnesses.

MAXIMILIAN TOCH.

Witnesses:
CHARLES A. LORETZ,
FRANK TOCH.